United States Patent [19]
Chernoch et al.

[11] Patent Number: 5,241,551
[45] Date of Patent: Aug. 31, 1993

[54] HIGH AVERAGE POWER LASER WHICH GENERATES RADIATION AT A WAVELENGTH NEAR 530 NM

[75] Inventors: Joseph P. Chernoch, Scotia; Mark J. Kukla, Ballston Spa; William T. Lotshaw, Schenectady; Josef R. Unternahrer, Niskayuna, all of N.Y.

[73] Assignee: General Electric Company, Schenectady, N.Y.

[21] Appl. No.: 889,580

[22] Filed: May 28, 1992

[51] Int. Cl.$^5$ .............................................. H01S 3/10
[52] U.S. Cl. ........................................ 372/22; 372/21; 372/71; 372/32; 359/328
[58] Field of Search ....................... 372/22, 21, 71, 29, 372/30, 32; 359/328, 330

[56] References Cited

U.S. PATENT DOCUMENTS

| 5,142,542 | 8/1992 | Dixon | 372/22 |
| 5,144,630 | 9/1992 | Lin | 372/22 |

FOREIGN PATENT DOCUMENTS 0252187 11/1991 Japan ...................................... 372/22

*Primary Examiner*—Georgia Y. Epps
*Attorney, Agent, or Firm*—James R. McDaniel; Paul R. Webb, II

[57] ABSTRACT

This invention relates to lasers which produce a high average power. Such structures of this type, generally, produce the high average power intensity having a high peak intensity at a wavelength near 530 nm.

12 Claims, 1 Drawing Sheet

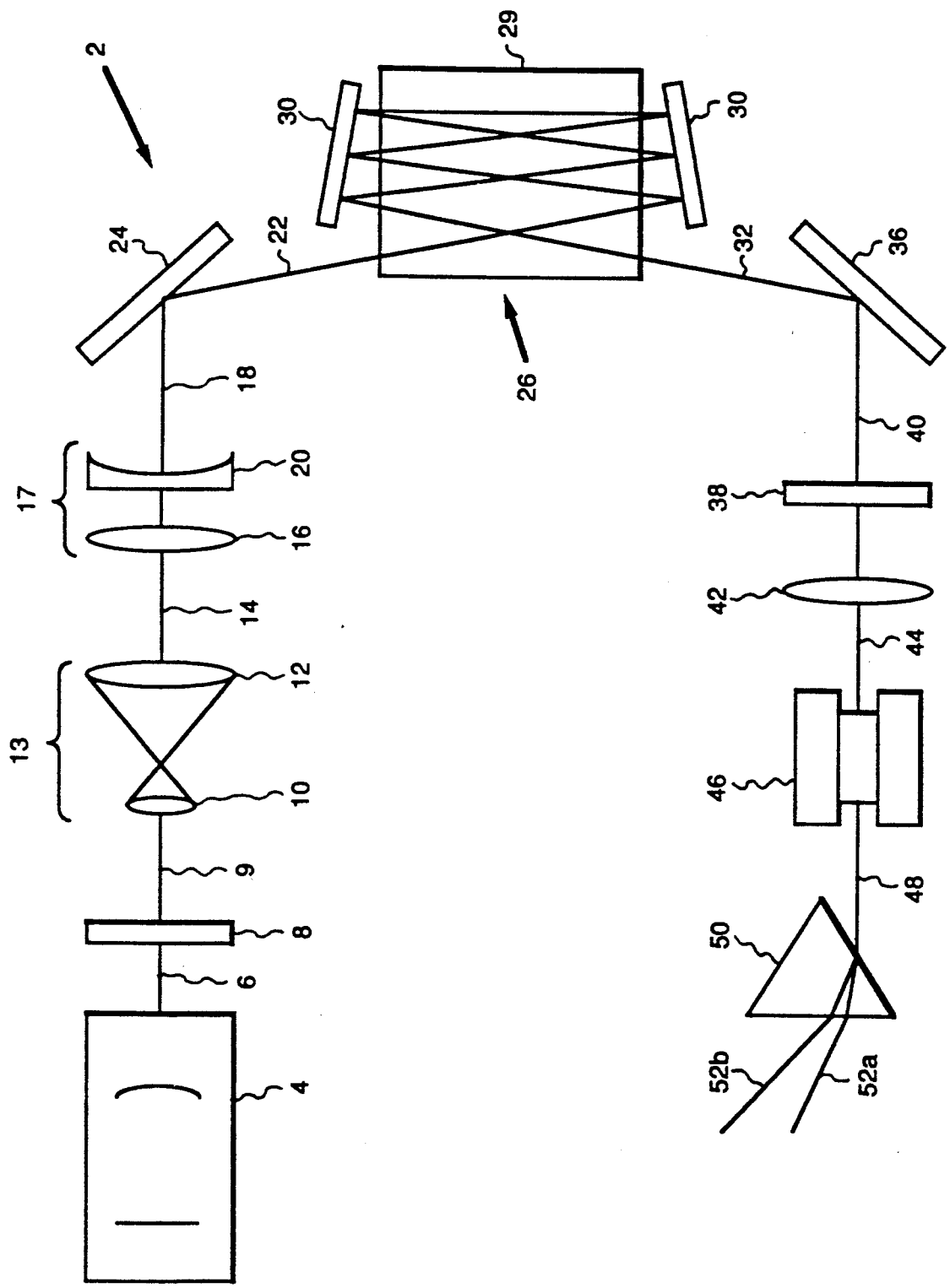

HIGH AVERAGE POWER LASER WHICH GENERATES RADIATION AT A WAVELENGTH NEAR 530 NM

BACKGROUND OF THE INVENTION

1. Field of the Invention

This invention relates to lasers which produce a high average power. Such structures of this type, generally, produce the high average power intensity having a high peak intensity at a wavelength near 530 nm.

2. Description of the Related Art

Several schemes are in use for frequency doubling a solid-state laser specifically a Nd:YAG laser. A pulse-pumped, Q-switched oscillator, optionally followed by a similarly pumped single pass amplifier and an external SHG (second harmonic generation) crystal is the most commonly used scheme. While high peak powers can be generated with this approach, the repetition rate, and hence also the average power, are severely limited.

Significantly higher repetition rates are achievable if intracavity SHG is used. This technique provides a high conversion efficiency, but since it excludes the addition of optical amplifiers, the extractable output power is restricted to the power available from the oscillator, and the chance for a further scale-up is forfeited.

The third possibility is "external resonant doubling" and is used mainly for CW lasers. This approach is technically more demanding than the others because it requires a single-axial-mode oscillator and the frequency-locking of a "slave" resonator to a "master" resonator. Since resonant doubling is, strictly speaking, a method to enhance the SHG efficiency it does not specify how the fundamental beam is produced (except that it has to be single-mode). These cases are the modi operandi that produce extremely long pulses, either because of a very high Q-switch repetition rate, or because the laser is not Q-switched, which includes true CW operation as the limiting case. Therefore, a more advantageous laser system, then, would be presented if the average power could be increased while maintaining a high peak power.

It is apparent from the above that there exists a need in the art for a laser system which produces a high average power and a high peak power, and which at least equals the average and peak power characteristics of known lasers but which at the same time is applicable to practically all known operating modes of lasers, ranging from true CW, CW-pumped modelocked or Q-switched, to pulse-pumped free-running or Q-switched, with the modulated-output-power modes spanning a range of repetition rates from single shot to 100 MHz. It is a purpose of this invention to fulfill this and other needs in the art in a manner more apparent to the skilled artisan once given the following disclosure.

SUMMARY OF THE INVENTION

Generally speaking, this invention fulfills these needs by providing a high average intensity and high peak intensity laser system, comprising an oscillator means which produces an optical beam, a first optical means having a mode matching optic means and located adjacent to said oscillator means such that said optical beam traverses said first optical means, a multipass amplifier means located adjacent to said first optical means such that said optical beam is traversed through said amplifier means in order to increase an intensity of said optical beam by a predetermined amount, and a second optical means having a frequency doubling crystal means and located adjacent to said amplifier means such that said optical beam having said increased intensity is traversed through said second optical means to create a laser beam having a high average intensity and a high peak intensity.

In certain preferred embodiments, the operating mode of the oscillator can either be continuous (CW) or modulated (pulsed). Also the mode matching optics includes a focusing lens and a cylindrical lens. The multipass amplifier means includes a travelling wave multipass amplifier having a gain medium which is optically excited and further includes two folding mirrors such that the intensity of the optical beam is increased by approximately a factor of 10. Finally, the frequency doubling crystal means includes an optically, non-linear crystal housed in an oven.

In another further preferred embodiment, a high average-power bundle of light near a wavelength of 530 nm is generated which has a high spectral purity.

The preferred laser system, according to this invention, offers the following advantages: high average intensity; high peak intensity; good stability; good durability; high spectral purity and high strength for safety. In fact, in many of the preferred embodiments, these factors of average intensity, peak intensity and spectral purity are optimized to an extent that is considerably higher than heretofore achieved in prior, known laser systems.

BRIEF DESCRIPTION OF THE DRAWING

The subject matter which is regarded as the invention is particularly pointed out and distinctly claimed in the concluding portion of the specification. The invention, however, may be best understood by reference to the following description taken in conjunction with the accompanying drawing Figure in which FIG. 1 is a schematic illustration of a high average intensity, high peak intensity laser, according to the present invention.

DETAILED DESCRIPTION OF THE INVENTION

With respect to FIG. 1, there is illustrated laser system 2. System 2 includes, in part, conventional oscillator 4, optical beam 6, mode matching optics 17, travelling wave multipass amplifier 26, conventional frequency doubling crystal 46, conventional dispersing prism 50, and laser beams 52a and 52b having frequencies $1\omega$ and $2\omega$, respectively. More particularly, 2 also includes conventional half-wave plates 8 and 38, optical beams 9, 14, 18, 22, 32, 34, 40, 44 and 48, conventional telescope 13 having conventional focusing lenses 10 and 12, conventional focusing lens 16, conventional cylindrical lens 20, conventional bending mirrors 24, 36, a face-pumped laser head 28 having a gain medium 29 which, preferably, is a Nd:YAG or other suitable crystal, folding mirrors 30 which are located at angle $\theta$ relative to laser head 28, and a conventional focusing lens 42.

With respect to frequency doubling crystal 46, crystal 46 typically includes a conventional optically, non-linear crystal (not shown) housed in an oven to adjust the temperature of the non-linear crystal to a value that is favorable for an efficient conversion to the second harmonic (SHG). Preferably, lithium triborate (LBO) is employed as the non-linear crystal but it is to be understood that any suitable optically, non-linear crystal can be used. In the case of LBO, this temperature, preferably is around 150° C. where a wavelength of 1064 nm can be converted to 532 nm under typical non-critical phasematching conditions.

During operation of system 2, oscillator 4, preferably, produces a linearly polarized TEMoo mode optical beam 6. Depending on the operating mode, beam 6 may be either CW (continuous) or modulated (pulsed). Halfwave plate 8 is used to rotate the polarization of beam 6 into whatever plane is most suitable for the subsequent optical elements. Telescope 13 and mode matching optic system 17 prepare the spotsize of beam 22 and the curvature of beam 22 such that it can be injected successfully into the multipass travelling wave amplifier 26. As mentioned earlier, amplifier 26 consists of a head 28 containing the gain medium 29, and at least two folding mirrors 30 that refocus beam 32 periodically on the many passes of beam 32 through amplifier 26. The periodic refocusing of the beam through head 28 should cause the intensity of beam 32 to be increased by a factor of approximately equal to 10. The gain medium 29 is optically excited by flashlamps or other means of optical pumping (not shown). This optical excitation is either CW or modulated, depending on the operating mode chosen for the application. After amplifier 26, another half-wave plate 38 rotates the still linear polarization into the plane required by the downstream optical elements, and a conventional focusing lens 42 of suitable focal length is used to scale down the size of beam 44 and hence to scale up its intensity, such that it can be successfully converted to the second harmonic in the frequency doubling crystal 46. Optionally, focusing lens 42 may be preceded by several conventional optical elements (not shown) with cylindrical optical power in order to compensate for the elliptical beam size and biaxial curvature caused by the multipass travelling wave amplifier 26. The benefit from this compensation is a higher peak intensity in the frequency doubling crystal 46 because the waists in the two principal planes of beam 44 can be made to occur at the same position along the beamline. Finally, after doubling crystal 46 some means of separating the second harmonic from the fundamental beam is provided if this is desired. In the simplest case a dispersing prism 50 can be used for that purpose.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. A high average intensity and high peak intensity laser system, wherein said laser system is comprised of:
    an oscillator means which produces an optical beam;
    a first optical means having a mode matching optic means and located adjacent to said oscillator means such that said optical beam traverses said first optical means;
    a multipass amplifier means located adjacent to said first optical means such that said optical beam is traversed through said amplifier means in order to increase an intensity of said optical beam by a predetermined amount; and
    a second optical means having a frequency doubling crystal means and located adjacent to said amplifier means such that said optical beam having said increased intensity is traversed through said second optical means to create a laser beam having a high average intensity and a high peak intensity.

2. The laser system, according to claim 1, wherein said optical beam is further comprised of:
    a continuous beam.

3. The laser system, according to claim 1, wherein said optical beam is further comprised of:
    a pulsed beam.

4. The laser system, according to claim 1, wherein said first optical means is further comprised of:
    a half-wave plate; and
    a telescope means.

5. The laser system, according to claim 1, wherein said mode matching optic means is further comprised of:
    a focusing lens; and
    a cylindrical lens.

6. The laser system, according to claim 1, wherein said laser system is further comprised of:
    at least two bending mirrors.

7. The laser system, according to claim 1, wherein said amplifier means is further comprised of:
    a travelling wave multipass amplifier.

8. The laser system, according to claim 7, wherein said faced pumped laser head is further comprised of:
    a gain medium.

9. The laser system, according to claim 1, wherein said second optical means is further comprised of:
    a half-wave plate;
    a focusing lens; and
    a dispersing prism.

10. The laser system, according to claim 7, wherein said folding mirrors are located at a predetermined angle with respect to said face-pumped laser head.

11. The laser system, according to claim 1, wherein said intensity of said optical beam is increased by a factor of approximately equal to 10 as said optical beam is traversed through said amplifier means.

12. The laser system, according to claim 7, wherein said amplifier means is further comprised of:
    at least two folding mirrors located at a predetermined distance away from each other; and
    a face-pumped laser head substantially located between said folding mirrors.

* * * * *